United States Patent [19]

Abramson et al.

[11] Patent Number: 5,569,696
[45] Date of Patent: Oct. 29, 1996

[54] STAIN RESISTANT GROUT

[75] Inventors: Bella Abramson, Tarzana; Jose D. Barrera, Hawthorne; Zosimo D. Pamaran, Yorba Linda; Anthony D. Pham, Costa Mesa, all of Calif.

[73] Assignee: The W. W. Henry Company, Huntington Park, Calif.

[21] Appl. No.: 502,132

[22] Filed: Jul. 13, 1995

[51] Int. Cl.⁶ .................. C08K 5/01; C08L 9/08; E04F 13/08; E04B 1/00
[52] U.S. Cl. .................. 524/487; 524/839; 524/840; 525/123; 52/389; 52/742.16
[58] Field of Search .................. 524/487, 494, 524/839, 840; 52/389, 744, 742.16; 525/123

[56] References Cited

U.S. PATENT DOCUMENTS

| 3,967,429 | 7/1976 | Weiant et al. | 52/742.16 |
| 4,629,648 | 12/1986 | Minick et al. | 428/189 |
| 5,387,644 | 2/1995 | Dischö | 524/847 |
| 5,396,749 | 3/1995 | Fukushima | 52/742.16 |

*Primary Examiner*—Paul R. Michl
*Assistant Examiner*—LaVonda R. DeWitt

[57] ABSTRACT

A stain resistant grout composition comprises a mixture of an acrylic latex, an aliphatic urethane and a paraffin. Preferably, the composition is an aqueous composition and is a low volatile organic compound (VOC) composition.

7 Claims, No Drawings

5,569,696

STAIN RESISTANT GROUT

FIELD OF THE INVENTION

The invention relates to a stain resistant grout composition. More particularly, the invention relates to a stain resistant ceramic tile grout composition which includes a mixture of an acrylic latex, an aliphatic urethane and a paraffin. Preferably, the composition is an aqueous composition and is a low volatile organic compound (VOC) composition.

BACKGROUND OF THE INVENTION

The tendency of ceramic tile grout to stain easily requires a high level of maintenance. Overcoming this deficiency has been a high priority for the ceramic tile industry for many years. While heat and chemical resistant grouts, such as epoxy and furan grouts, exist on the commercial market, these grouts contain hazardous ingredients and require the expertise of a professional installer.

The present invention results in a grout product for ceramic tile that is highly resistant to a wide variety of staining agents. The composition takes two forms: a liquid admix for standard portland cement grout and a one component, pre-mixed paste.

Dischö U.S. Pat. No. 5,387,644 discloses a hardenable monomer composition useful for grouts. The Disohö composition comprises a mixture of a crosslinkable acrylic monomer, carbon black and/or a polyester- or polyether-methane oltgomer having at least two polymerizable double bonds and a paraffin oil. The oltgomer is an aliphatic or aromatic, bifunctional or polyfunctional polyester- or polyether-urethane acrylate. Therefore, the Dischö composition is not a mixture of an acrylic latex, an aliphatic urethane and a paraffin, but the reaction product of a crosslinkable acrylic monomer and a reactive acrylic end-capped polyester- or polyether urethane. Further, the Dischö composition is a liquid and the urethane oligomer has a molecular weight of no more than 2,000.

SUMMARY OF THE INVENTION

In accordance with the present invention, the stain resistant grout composition comprises a mixture of an acrylic latex, an aliphatic urethane and a paraffin. Preferably, the composition is 5% to 40% by weight of acrylic latex, 0.5% to 15% by weight of aliphatic urethane and 0.5% to 6% by weight of paraffin.

More preferably, the acrylic latex is 10% to 30% by weight of the composition, and still more preferably about 15% to about 20% by weight. More preferably, the aliphatic urethane is 0.5% to 10% by weight of the composition, and still more preferably about 1% to about 4% by weight. More preferably, the paraffin is 0.5% to 3% by weight of the composition, and still more preferably 0.5% to 1% by weight. The minimum amounts of the components are needed for improved stain resistance. The components increase cure time of the composition, therefore less water is trapped under the skin which forms on the surface of the composition.

If the aliphatic urethane is greater than 15%, the composition is too hard and tough, and the workability and desired properties are reduced. If the paraffin is greater than 6%, adhesiveness of the composition is reduced.

The preferred aliphatic urethane is a fully reacted, thermoplastic urethane and has a molecular weight greater than 10,000. The allphatic urethane is preferably dispersed in a blend of water, N-methylpyrrolidone and amine. The preferred paraffin is a paraffin wax.

DETAILED DESCRIPTION OF THE INVENTION

The acrylic latex serves as the vehicle which carries the other components of the composition and dries by evaporation. The acrylic latex provides alkali resistance and promotes adhesion. The quick release of volatile components in the acrylic latex, compared to other latexes, promotes early hardness development.

The paraffin provides water resistance by "floating" to the surface of the composition and forming a shield on the surface of the grout. The paraffin provides immediate stain resistance while the acrylic resin and urethane cure over the first few hours to three days.

The urethane enhances volatilization of the latex water, repels external water, improve the continuity of the filler, and improves adhesion, abrasion resistance, chemical resistance and stain resistance. The combination of these components yields a product which dries hard and is impervious to penetration by stain carrying agents.

The grout of the present invention is not only impervious, but also is harder than existing cement grouts. Therefore, the present grout also improves abrasion resistance.

The preferred aliphatic urethane is a fully reacted, thermoplastic urethane such as Spensol L41-MPW-32, Spensol L44-MPW-32, Spensol L51-MPW-35, Spensol L52-MPW-30, Spensol L53-MPW-30, Spensol L54-MPW-32, Spensol L55-MPW-35 and Spensol L56-MPW-36, all of which are manufactured by Reichhold Chemicals, Inc. Spensol L-MPW-32 and Spensol L44-MPW-32 are less expensive resins which can be used when color stability is not critical. Spensol L51-MPW-35 has a higher hardness. Spensol L52-MPW-30 has a low impact resistance. Spensol L53-MPW-30 has the best abrasion resistance. Spensol L54-MPW-32 is suitable for both air dry and force dry application. Spensol L55-MPW-35 and Spensol L56-MPW-36 can be used for flexible substrates.

The urethane is preferably a water dispersible polyurethane elastomer; more preferably it is dispersed in a blend of water, N-methylpyrrolidone and amine. The preferred amine is triethylamine and the preferred weight ratio of urethane/water/N-methylpyrrolidone/amine is about While the aliphatic urethane dispersion has a small percentage of organic solvent, the grout composition is a low VOC composition. Because the composition does not include epoxy components, the grout can be exposed to UV light without yellowing, i.e. has UV resistance.

Numerous additives, well known in the art, can be included in the grout composition for their known purposes. Such additives include anti-settling agents, humectants, pH control agents, biocides, freeze/thaw stabilizers, surfactants, fillers/extenders, drying rate controllers, defoamers, shrinkage controllers, anti-oxidants and pigments. Examples 1 to A set forth one-part grout compositions of the present invention which can be used directly as a ceramic tile grouts.

| Component | EXAMPLE 1 Parts by wt. | EXAMPLE 2 Parts by wt. | EXAMPLE 3 Parts by wt. | EXAMPLE 4 Parts by wt. |
|---|---|---|---|---|
| Acrylic latex | 527[1] | 527[1] | 1125[3] | 1000[2] |
| Aliphatic urethane dispersion | 100[4] | 100[4] | 240[6] | 130[4] |
| Paraffin wax emulsion[7] | 20 | 20 | 100 | 20 |
| Water | 73 | 73 | 73 | 73 |
| Calcium carbonate | 144 | 544 | 216 | 1000 |
| Silica | 2171 | 1571 | 1200 | 1400 |
| Ammonium hydroxide | 0.25 | 0.25 | 0.25 | 0.25 |
| Hydroxypropyl methyl cellulose | 1 | 1 | 1 | 1 |
| Biocide | 12.5 | 12.5 | 12.5 | 12.5 |
| Propylene glycol | 73 | 73 | 73 | 73 |
| Surfactant | 5 | 5 | 5 | 5 |
| Diluent | 5 | 5 | 5 | 5 |
| Glycol ether | 10 | 10 | 10 | 10 |
| Defoamer | 1.25 | 1.25 | 1.25 | 1.25 |
| Shrinkage controller | 195 | 195 | 200 | 195 |
| Titanium Dioxide | 34 | 34 | 34 | 34 |
| Anti-oxidant | 24 | 24 | 24 | 24 |
| | 3396 | 3196 | 3320 | 3984 |

[1] Ucar 422 manufactured by Union Carbide Corp.
[2] Unocal 1018 manufactured by Rohm and Haas
[3] Acronal S-705 manufactured by BASF
[4] Spensol L-54-MPW-32
[5] Neorez R-9409 manufactured by Zencca
[6] Spensol L-512 manufactured by Reichhold
[7] Aqua Bead 325E manufactured by Micro Powders, Inc. of New York Although a specific acrylic latex, aliphatic urethane and paraffin wax have been identified, other acrylic latexes, aliphatic urethanes and paraffins including paraffin oils can be used.

EXAMPLE 5

Example 5 sets forth a liquid admix of the present invention which has been formulated for use with standard portland cement grout compositions. The admix is added to a typical grout formulation, such as a portland cement composition, in a ratio of 1 to 20 by weight to 1 to 30 by weight.

| Component | Parts by wt. |
|---|---|
| Acrylic latex[1] | 70 |
| Aliphatic urethane dispersion[4] | 16.8 |
| Paraffin wax emulsion[7] | 6 |
| Water | 70 |
| Surfactant | 1.4 |
| Biocide | 0.3 |
| | 164.5 |

[1], [4] and [7] as identified above.

EXAMPLE 6

| Component | Parts by wt. |
|---|---|
| Acrylic latex[2] | 1292 |
| Aliphatic urethane dispersion[5] | 380 |
| Paraffin wax emulsion[7] | 120 |
| Water | 73 |
| Calcium carbonate | 1071 |
| Ammonium hydroxide | 0.25 |
| Hydroxypropyl methyl cellulose | 1 |
| Biocide | 12.5 |
| Propylene glycol | 73 |
| Surfactant | 5 |
| Diluent | 5 |
| Glycol ether | 10 |
| Defoamer | 1.25 |
| Shrinkage controller | 200 |
| Titanium dioxide | 34 |
| Anti-oxidanr | 24 |
| | 3302 |

[2,5] and [7] as identified above.

We claim:

1. A ceramic tile grout composition comprising a mixture of an acrylic latex, an aliphatic urethane and a paraffin.

2. The composition of claim 1 wherein the composition is an aqueous composition.

3. The composition of claim 1 wherein the composition is 5% to 40% by weight of acrylic latex, 0.5% to 15% by weight of acrylic urethane and 0.5% to 6% by weight of paraffin wax.

4. The composition of claim 1 wherein the aliphatic urethane is a fully reacted, thermoplastic urethane.

5. The composition of claim 4 wherein the aliphatic urethane is dispersed in a blend of water, Nmethylpyrrolidone and amine.

6. The composition of claim 4 wherein the aliphatic urethane has a molecular weight of at least 10,000.

7. The composition of claim 1 wherein the paraffin is a paraffin wax.

* * * * *

UNITED STATES PATENT AND TRADEMARK OFFICE
CERTIFICATE OF CORRECTION

PATENT NO. : 5,569,696

DATED : October 29, 1996

INVENTOR(S) : Bella Abramson et al.

It is certified that error appears in the above-identified patent and that said Letters Patent is hereby corrected as shown below:

In column 1, lines 30 and 31, "oltgomer" should be --oligomer--. In column 2, line 52, "32/49/16/3" should appear after the word "about". In column 2, line 64, "A" should be --4--. In column 3, lines 49-57, the table should appear after the heading "EXAMPLE 6" on line 61. In column 3, lines 64-66 through column 4, lines 30-45, the table should appear after "weight" in column 3, line 46. In column 4, claim 5, line 59, "Nmethylpyrrolidone" should be --N-methylpyrrolidone--.

Signed and Sealed this

Twenty-fifth Day of March, 1997

Attest:

BRUCE LEHMAN

Attesting Officer

Commissioner of Patents and Trademarks